United States Patent [19]
Schadebrodt et al.

[11] 3,783,741
[45] Jan. 8, 1974

[54] PROGRAM CONTROLLED COORDINATE MACHINE

[75] Inventors: Gerhard Schadebrodt, Neu-Isenburg; Gustav Altzschner, Kleinosiheim; Hans-Helmut Feldmann, Neu-Isenburg; Bernhard Graichen, Neu-Isenburg; Wolfgang Pabst, Neu-Isenburg, all of Germany

[73] Assignee: LICENTA Patent-Verwaltung-GmbH, Frankfurt am Main, Germany

[22] Filed: Aug. 30, 1971

[21] Appl. No.: 176,118

[30] Foreign Application Priority Data
Aug. 29, 1970 Germany.................. P 20 42 912.3

[52] U.S. Cl...................... 90/13 C, 90/15, 33/23 C, 408/234, 408/3
[51] Int. Cl.......................... B23b 47/00, B23c 1/16
[58] Field of Search.................... 90/13 C, 15, 11 R; 408/234, 3; 33/23 C, 1 M

[56] References Cited
UNITED STATES PATENTS

| | | | |
|---|---|---|---|
| 2,028,727 | 1/1936 | Perry et al...................... | 408/234 X |
| 3,171,327 | 3/1965 | Williamson.......................... | 408/3 X |
| 3,559,510 | 2/1971 | Blackburn.............................. | 408/3 |
| 3,575,071 | 4/1971 | Miller................................. | 90/13.9 |
| 3,420,347 | 1/1969 | Bales................................. | 408/3 |
| 2,824,499 | 2/1958 | Gambin et al.................. | 408/234 X |
| 2,956,344 | 10/1960 | Rantsch.......................... | 408/234 X |
| 3,650,178 | 3/1972 | Appleton............................... | 90/15 |

Primary Examiner—Gil Weidenfeld
Attorney—George H. Spencer et al.

[57] ABSTRACT

A program controlled coordinate machine including at least two separately functioning coordinate modules each including a bed on each of which a carriage is supported for movement. One of the modules is supported by the other module which in turn is supported by a support module. The support is such that the carriages move in defined perpendicular directions with respect to each other. The support module is enclosed by a housing module which also supports electronic modules which house the electronic components required for machine control.

10 Claims, 7 Drawing Figures

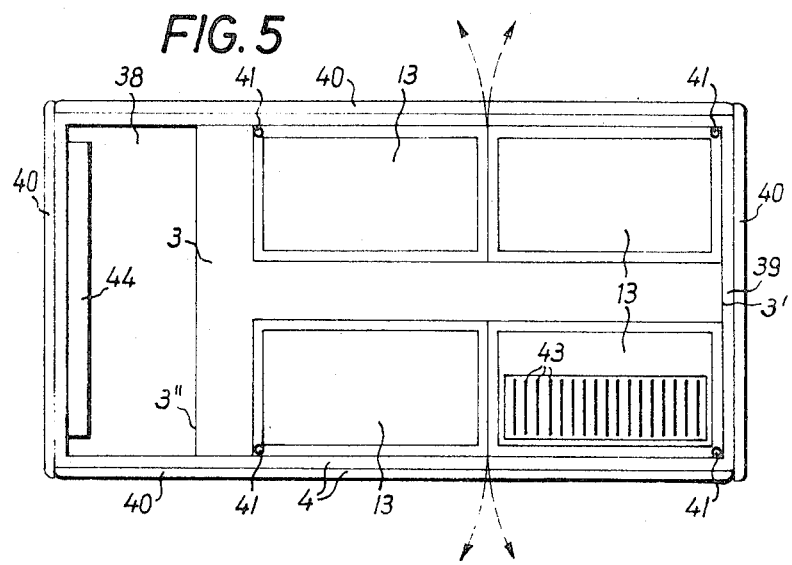
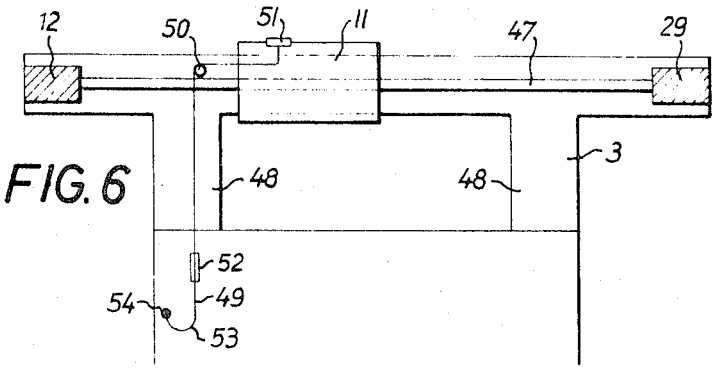
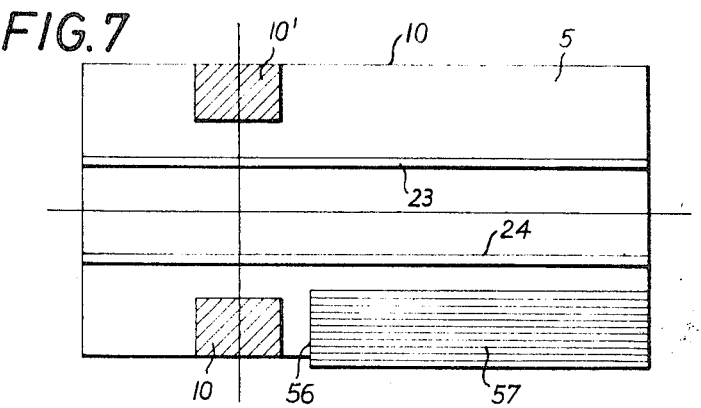

PROGRAM CONTROLLED COORDINATE MACHINE

BACKGROUND OF THE INVENTION

The present invention relates to a program controlled coordinate machine, and more particularly, to a program controlled coordinate machine of modular construction in which at least two separately functioning coordinate modules each including a movable carriage, which move in mutually perpendicular directions, a support module for supporting the coordinate modules and a housing module for the support module are included.

A coordinate machine in which an open base structure standing on the ground and supporting the X as well as the Y coordinate structures including elements such as a bed, carriage, drive means, etc. is known. Such a machine is disclosed in the Allgemeine Elektricitats-Gesellschaft publication entitled "Koordinatentische" 4219.102; A22v/0469. For the X coordinate structure a bed with a full carriage which is movable is fastened at a certain level below the open base structure to two perpendicular supporting pillars of the open base structure, while for the Y coordinate structure a transverse bar of the open base structure is used as the bed on which a carriage which is also movable is disposed. Each bed has its own drive motor which is connected to a bearing supported shaft for driving the respective carriages. The position of the carriage is determined by means of a position measuring value generator which is coupled with the bearing supported shaft.

The open base structure is simultaneously the support for the bed, the carriage and the drive means for both coordinate structures.

The open base structure is a machine component of a relatively complicated type to which all the other components (bed, carriage) must be mounted. The open base structure includes two "kangaroo" feet on which the bed for the Y coordinate structure is placed. The contact surface of the feet is relatively small so that the open base structure has very little rigidity in the Y direction. The elongated bed for the X coordinate structures is fastened only to the feet so that here too the rigidity is not sufficient. The machine is thus relatively unstable in both coordinate directions. The accurate positioning of the carriage on the X coordinate structure with respect to the carriage on the Y coordinate structure can be realized only as a result of a large number of measurements since the bed for the X coordinate structure is suspended on the open base structure only between the relatively narrow feet without means being provided for fixing the position of the bed. Peripheral devices which are required for the automatic control of the machine are disposed at a separate location in the room where the machine is installed and are connected with the machine by longer or shorter cables.

At present, coordinatographs are finding extensive use in construction offices for a variety of drawing needs, so that program controlled coordinate machines are in great demand. The known coordinate machine is not very well suited for this purpose, however, because of the large amount of space required for the machine and the control instruments connected therewith.

SUMMARY OF THE INVENTION

It is, therefore, a general object of the present invention to provide a coordinate machine which has a high rigidity and thus great accuracy, which can be manufactured economically in large numbers, in which the individual machine components can easily be processed and installed in assembly, and in which exposed cables leading to the machine are reduced to a minimum.

It is another and more specific object of the present invention to provide a coordinate machine which utilizes modular construction for the coordinate structures, the support structure and the housing structure.

These and other objects are accomplished according to the present invention by the provision of a program controlled coordinate machine including at least two coordinate modules which are separately functionable and which comprise a bed with a drive means built thereinto a carriage guide and a carriage supported by the bed; a supporting module for supporting the coordinate modules when they are assembled, the supporting module being connected with the bed of one of the coordinate modules at a plurality of points; and a housing module in the shape of a box which encloses the supporting module and which houses the required electronic components for the numerical control of the coordinate machine, for example an arithmetic unit that receives digital signals representing nominal position values and digital signals representing the actual position of the element (carriage) to be moved. Further a suitable program storage device, for example a punched tape reader etc.

The present invention will be explained in detail below with the aid of a two-coordinate machine which is schematically illustrated in the drawings. In the same sense, it should be understood that the machine can also be supplied with more than two coordinate modules.

BRIEF DESCRIPTION OF THE DRAWINGS

FIG. 5 is a top plan view illustrating the open housing module with the base structure and the electronic component modules in assembly.

FIG. 6 shows one embodiment in which the single movable cable of the machine is guided to one of the movable carriages.

FIG. 7 is a top plan view showing the configuration of one of the bed structures supported by the base structure in assembly with a pair of carriage rails and an operator's desk.

DESCRIPTION OF THE PREFERRED EMBODIMENTS

Figure 1:
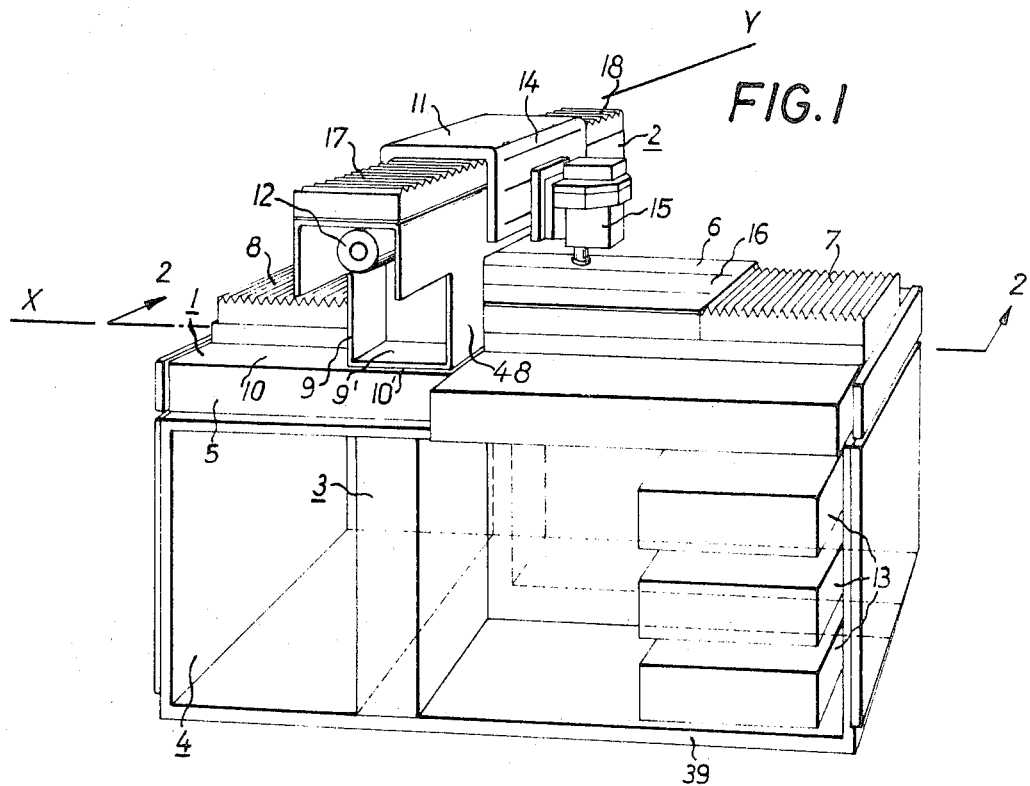
FIG. 1 is a schematic perspective view of a coordinate machine according to the present invention.

Referring more specifically to FIGS. 1–7, it can be seen in FIG. 1 that the coordinate machine of the present invention includes four modules, 1 through 4, which can be easily manufactured.

The coordinate module 1 embodies the X coordinate structure and includes a cast iron bed 5 on which a movable carriage 6 is mounted. A portion of the bed 5 is covered by bellows 7 and 8. A motor drive, a drive shaft, a carriage guide and the position measuring valve generator for carriage 6 are provided to adjust the position of the carriage 6 on the bed 5. The cooperation of these elements will become apparent from the discussion that follows.

The X coordinate module 1 may be separately fabricated from the remainder of the coordinate machine and is available in operational condition when the machine is assembled.

The coordinate module 2 embodies the Y coordinate structure and includes an open bed or portal-shaped structure 9 with vertical struts 48 and short transverse struts 9' which are permanently connected with the bed 5 of the X coordinate module 1 at station 10' of surface 10 in any conventional manner. The open bed structure 9 bears a movable carriage 11; a motor drive for carriage 11, a drive shaft, a carriage guide and a position measuring device 12 for the carriage 11 are also disposed on the bed. The cooperation of these elements is similar to those for the X coordinate module.

The Y coordinate module 2 may be separately fabricated in the same manner as the X coordinate module 1 and is independently operated. Both separately fabricated coordinate modules 1 and 2 are permanently connected together at station 10', so that the coordinate module 1 serves as the support for coordinate module 2. The third module 3 is, for example, a T-shaped support resting on the ground. The bed 5 of coordinate module 1 rests on support 3 at three connecting points. The housing module 4 covers support module 3 and accommodates the electronic component modules 13 required for the numerical control of the coordinate machine.

The machine may be used as a drafting machine or as a light-weight machine tool. A tool 15 or a drafting instrument (not shown) is disposed on the perpendicular surface 14 of the carriage 11, while the surface 16 of the carriage 6 holds the drafting material or the piece to be worked. A portion of the bed structure 9 is also covered by bellows 17 and 18.

Figure 2:
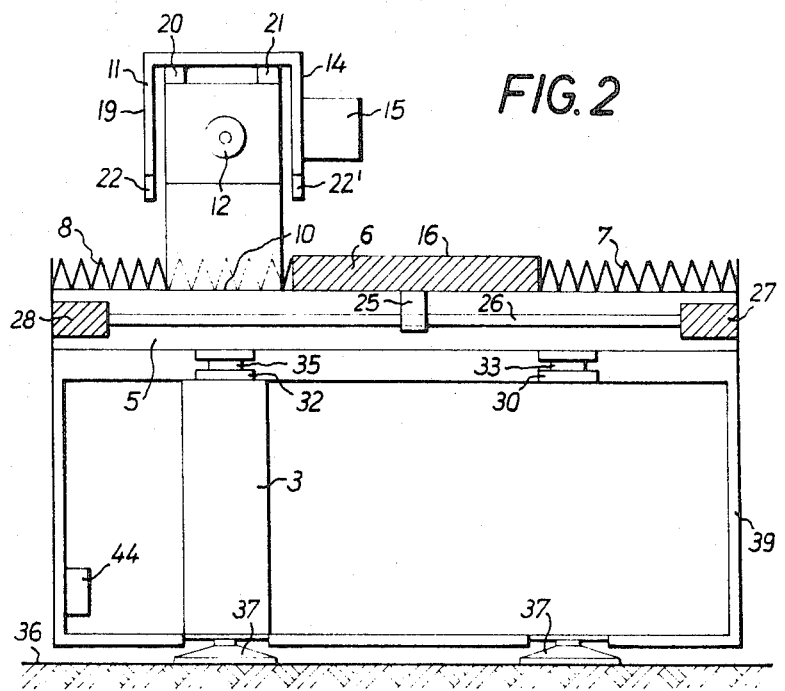
FIG. 2 is a sectional view taken along line 2—2 of the coordinate machine of FIG. 1.

As can be seen in FIG. 2, the carriage 11 has a U-shape so that two clamping surfaces 14 and 19 are available. Guides 20 and 21 are provided for carriage 11. The U-shaped carriage 11 with its guides 20 and 21 produces, with the downwardly extending arms 22 and 22' and the weighted tools attached to these arms, a low lying center of gravity so that bending stresses on the guides are not critical.

At both sides of carriage 6 of module 1, bellows 7 and 8 are disposed in the direction of carriage movement. These bellows cover the guides 23 and 24 for the carriage 6. The carriage 6 is provided with a bearing block 25 which is disposed on a bearing supported shaft 26 through which translational movement is imparted to the carriage 6. Such carriage movement can be accomplished by providing threads on the shaft 26 and internal threads in the block 25 as are found in conventional lead screw and threaded nut drive means.

The shaft 26 is mounted on the bed 5 which is provided at its one end also with motor drive 27, which is permanently connected to the bed 5, and at the other end with a position measuring device 28, which is also permanently connected to the bed 5, for the positioning of the carriage 6. The position measuring devices 28 and 12 are known per se and have been described, for example, in U.S. Pat. No. 3,419,727 which is entitled "Device for digital measurement of angular motion." The devices provide a digital position indicating signal of the carriages 6 and 11.

The same configuration of drive bearing supported shaft and position measuring device is provided for carriage 11 of module 2, with only the position measuring device 12 being shown. Instead of the bellows 7 and 8 and 17 and 18 for covering beds 5 and 9, it is also possible to use shutters for the same purpose. The individually fabricated coordinate modules 1 and 2 are assembled into a unit, as stated above by connecting the transverse struts 9' at point 10, and the assembled unit is then supported by the supporting module 3 which is entirely separate from the coordinate modules.

Figure 3:
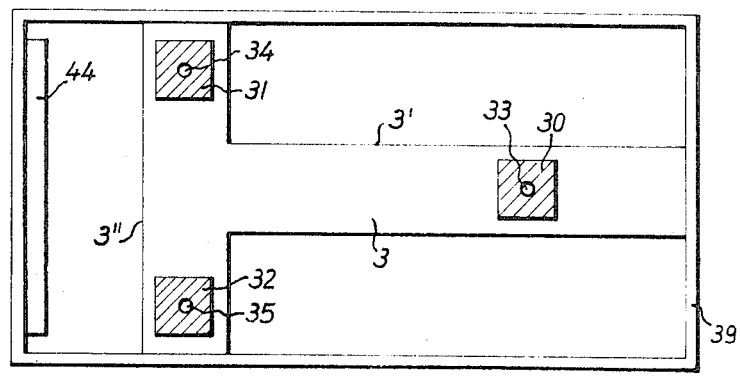
FIG. 3 is a top plan view of the base structure of the machine of the present invention.

The support module 3 does not require high precision in its fabrication and may be provided as a welded piece. The contact surfaces on the support module 3 for supporting the bed 5, of the coordinate module 1 also need not be worked to a high degree of precision. The support module 3 is, for example, designed to have a T-shape as can be seen in FIG. 3. The surface of support module 3 facing coordinate module 1 has three raised portions 30, 31, 32 which are designed as ball sockets. Ball joints 33 through 35 are disposed in the ball sockets and support the bed 5 of the coordinate module 1. These three ball and socket joints form a three point contact for the bed 5 so that twisting of the bed is substantially prevented. Influences of the support module 3 on the position of bed 5 are also practically eliminated by the three point mount for the bed. The support module 3 rests on a floor 36 and is provided with adjustable cup feet 37. The support module 3 need not necessarily be T-shaped but can also have an H shape, for example.

Figure 4:
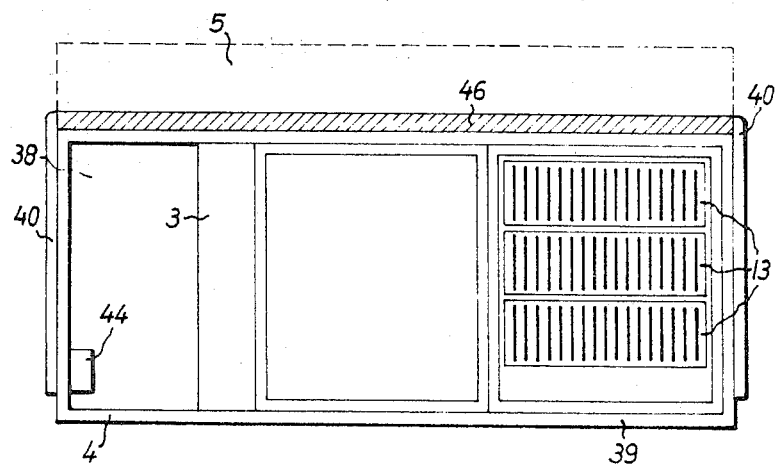
FIG. 4 is an elevation view partly in section showing the box-shaped housing module and the base structure of the present invention.

As can be seen particularly in FIGS. 4 and 5, the support module 3 is enclosed by a box-shaped housing module 4 which is also an independent module. Module 4, in addition to housing the support module 3, accommodates the electronic component modules 13. These electronic component modules, such as for example control devices, amplifiers, network components and the like, are independent units which can be separately manufactured and can be placed into the housing module 4 in an operational condition.

As can be seen in FIG. 5, the T-shape of the support module 3 results in a partition within the housing module 4. The two spaces resulting due to the longitudinal strut 3' of the support module 3 are filled by the electronic component modules 13. The space 38 resulting from the transverse strut 3" of the support module 3 can be filled with relays, fuses, etc. The housing module 4 is configured as a frame type structure 39 with insertable panels 40 covering the four side walls thereof. The panels 40 are supported, for example, by slits provided in the frame 39 of the housing module 4.

As shown in FIG. 5 the electronic component modules 13 are preferably pivotally mounted by a joint 41 to the frame 39 of the housing module 4 and can be moved in the direction of the arrows. The modules 13 are frame structures with circuit chassis 43, known as printed circuits, supported therein. By providing for pivoting of these frame structures, the wired rear side of the circuit chassis are easily accessible.

The housing module 4 is provided with a type of trough 44 for accommodating electrical cables. The electrical cable 49 (main cable) is led through trough 44 to the carriage 11.

The electronic component modules 13 accommodated in the housing module 4 are known to produce heat. In order to prevent heat dissipation to the bed 5 of the coordinate module 1, a heat insulating plate 46 (FIG. 4) is provided. The plate 46 is provided with access holes (not shown) through which the ball joints are inserted for connection to the bed 5. Therefore, the heat dissipation from the electronic component modules to the coordinate modules 1 and 2 is thus possible only via the three point mount 33 to 35 (FIG. 3) which, however, is negligible.

All modules 1 through 4 and 13 can be separately fabricated and can be separately tested so that any further testing operations after assembly are unnecessary.

The coordinate machine can be installed by first placing the T-shaped support module 3 at the desired position at the location where the machine is to be installed. Then the housing module 4 with its operational electronic components in the modules 13 is lowered over the support module 3. Next the completed coordinate module 1 is placed on top of support module 3 and then the completed coordinate module 2 is placed onto the fastening surface 10 of bed 5 of coordinate module 1 and both beds 5 and 9 are connected together, for example, by means of bolts.

Drives 27, 29 for carriages 6 and 11 may be direct current drives or stepping motors.

Since drives 27 and 29 are permanently connected with beds 5 and 9, respectively, and the electronic control device for these drives is accommodated in the stationary housing module 4, no movable cables are present; and since the position measuring devices 12 and 28 are also permanently attached to beds 5 and 9, respectively, and their electric signals are fed to the electronic control, no movable cables are required to feed these signals from devices 12, 28 to the electronic control in the modules 13 disposed in the housing module 4; the wiring can be permanent. No flexible cables are further required for moving carriages 6 and 11 or for indicating the position of these carriages.

The only movable cable required in the use of the coordinate machine as a drafting machine or machine tool is the cable which leads to the tool 15 disposed on carriage 11.

FIG. 6 shows one embodiment in which the cable 49 is guided to the carriage 11. In FIG. 6, only the portal-shaped or open bed structure 9 with its drive 29, drive shaft 47, carriage 11, and position measuring device 12 of the machine are shown.

The supporting struts 48 of the portal-shaped bed 9 are designed to be hollow (see also in this connection FIG. 1) so that the movable cable 49 can be brought through one of the supporting struts. Cable 49 is guided about a guide pin 50 and is connected with the end piece 51 to the carriage 11, on which the tool (not shown in detail) is disposed. Within the vertical passage of cable 49 a weight 52 is disposed which serves to tension the cable in every translated position of the carriage 11. This configuration results in a cable loop 53 which loosely hangs into housing module 4. The cable end 54 is connected with the appropriate points of the electronic control device in the modules 13.

FIG. 7 shows the configuration of bed 5 of coordinate module 1. This bed has a precision surface and is provided with guide rails 23 for guiding a carriage 6. Contact surfaces defining the stations 10' for supporting the perpendicularly disposed bed 9 of coordinate module 2 are also provided. The bed 5 is asymmetrically designed and provided with a recess 56. This recess may contain an operator's desk 57 which contains all the operational elements required for controlling the coordinate machine.

The operator's desk 57 is also an independent module. It is connected with module 13 via stationary plug-in connections The operator's desk 57 can easily be removed from bed 5 and be set up at any desired location. The desk 57 and the machine in this case are connected via an appropriately designed cable and the machine can thus be remotely controlled from the location of desk 57. The desk 57 may also be fabricated and tested entirely independently.

If an operator's desk 57 is not required, perhaps because the operating elements for the coordinate machine are already contained in other peripheral instruments, a blind desk is placed into recess 56.

With the arrangement of the operating elements for the coordinate machine in desk 57 there results the advantage that the coordinate machine need not necessarily be operated at that location of the machine, but rather, by removal of the operator's desk from the machine, a remote control of the machine from any desired location is possible. This may be appropriate when the coordinate machine is located in a construction office and the construction engineer wants to have a drawing made by the coordinate machine while sitting at his desk.

One of the advantages realized with the present invention is that all instruments required for the numerical control of the machine are built into the coordinate machine, so that the peripheral instruments previously required for control of such machines with their necessary cable connections to the machine are eliminated. On the other hand, the operator's desk which can be removed from the machine also permits, if required, remote control of the machine. The coordinate machine is further so designed that it is possible to use devices already at hand for controlling the machine so that the electronic components in the modules 13 and the operator's desk 57 are not required. Since, the housing module 4 is present in any case, the coordinate machine may be supplied at a later date with the electronic component modules 13 containing the electronic control components. The coordinate machine can thus be easily and effortlessly operated at its point of location or from any other location.

Another of the advantages realized with the present invention is the simplicity and versatility derived from the modular configuration which leads to economies of design, fabrication and installation of such machines.

It will be understood that the above description of the present invention is susceptible to various modifications, changes and adaptations, and the same are intended to be comprehended within the meaning and range of equivalents of the appended claims.

We claim:

1. A program controlled coordinate machine adapted to be used for drafting and light machining, comprising:
   a. two separately functioning coordinate modules which are vertically superposed and assembled into a unit, one of said coordinate modules constituting the sole support for the other of said coordinate modules, each module including a stationary bed with drive means built thereinto, a stationary carriage guide mounted on each bed and a carriage driven by said drive means and arranged on each carriage guide for movement solely in one coordinate direction, the stationary carriage guides of the one and the other module being so disposed with respect to one another that the two coordinate directions are normal to one another;

b. a support module for the assembled coordinate modules which is connected with that coordinate module which supports the other coordinate module.

2. A program controlled coordinate machine as defined in claim 1, wherein each drive means includes a drive motor; a position measurement device, said drive motor and said position measurement device being fixedly attached to the bed of the respective coordinate module; a shaft extending between and engaging said drive motor and said position measurement device, said shaft being connected to the carriage of the respective coordinate module for displacing said carriage along said shaft.

3. A program controlled coordinate machine as defined in claim 2, wherein each carriage guide of the respective coordinate module comprises a pair of rails extending in a direction parallel to said shaft in that module, and wherein said direction coincides with the coordinate direction of the carriage.

4. A program controlled coordinate machine as defined in claim 2, further comprising deformable means attached to each carriage and extending from opposite sides thereof in the direction parallel to said shaft into engagement with two end walls of the respective coordinate module, said deformable means serving to cover said rails.

5. A program controlled coordinate machine as defined in claim 1, wherein the carriage of one of said coordinate modules is U-shaped and includes means on at least one side thereof for supporting a tool.

6. A program controlled coordinate machine as defined in claim 1, the improvement further comprising a housing module enclosing said support module.

7. A program controlled coordinate machine as defined in claim 1, further comprising hollow projecting means connecting the two coordinate modules to one another.

8. A program controlled coordinate machine as defined in claim 7, including a cable which is passed through said projecting means and which is connected to a tool supported by the carriage of one of said coordinate modules.

9. A program controlled coordinate machine as defined in claim 1, wherein one of said coordinate modules is so supported by the other of said coordinate modules that the bed of said one coordinate module extends over and across the bed of said other coordinate module.

10. In a program controlled coordinate machine adapted to be used for drafting and light machining, comprising a first carriage which is movable in a first coordinate direction, a second carriage which is movable in a second coordinate direction perpendicular to the first direction, the improvement comprising:

a. two separately functioning coordinate modules which are vertically superposed and assembled into a unit, each module including a bed with drive means built thereinto for driving said carriage, a carriage guide mounted on each bed for supporting the carriage of the respective coordinate module;

b. a T-shaped support module; and c. a plurality of supporting means connecting said support module with the bed of one of the coordinate modules, and plurality of supporting means includes three sets of ball and socket joints.

* * * * *

UNITED STATES PATENT OFFICE
CERTIFICATE OF CORRECTION

Patent No. 3,783,741　　　　　　Dated January 8th, 1974

Inventor(s) Gerhard Schadebrodt, Gustav Altzschner, Hans-Helmut Feldmann, Bernhard Graichen and Wolfgang Pabst It is certified that error appears in the above-identified patent and that said Letters Patent are hereby corrected as shown below:

In the heading of the patent, line 5, change "Kleinosiheim" to --Kleinostheim--; line 9, change "LICENTA" to --LICENTIA--. Column 1, line 46, change "structures" to --structure--. Column 3, line 5, change "valve" to --value--. Column 8, line 30, delete "drive"; line 37, change "and" to --said--.

Signed and sealed this 9th day of July 1974.

(SEAL)
Attest:

McCOY M. GIBSON, JR.
Attesting Officer

C. MARSHALL DANN
Commissioner of Patents